United States Patent Office 3,037,590
Patented June 5, 1962

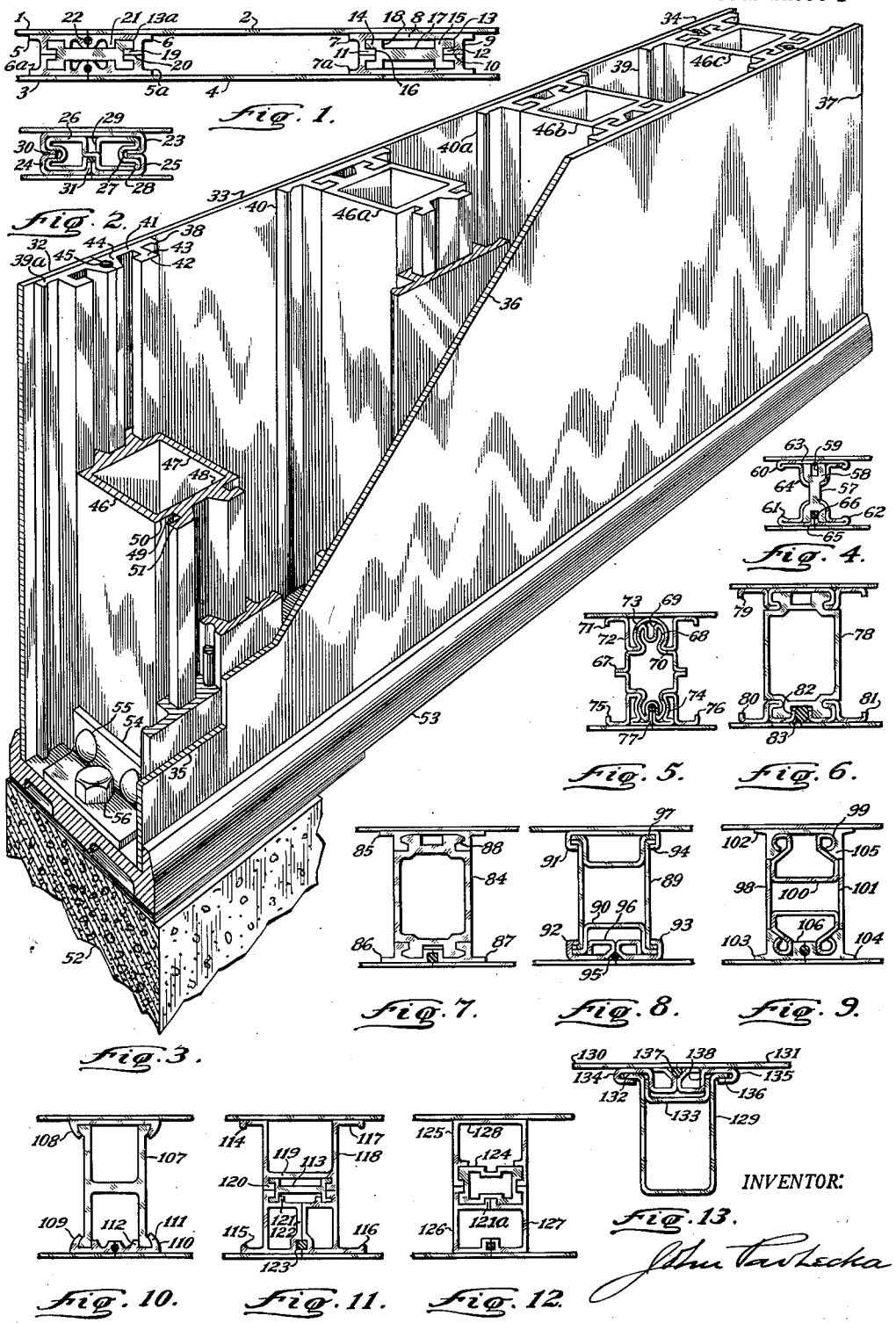
June 5, 1962 J. PAVLECKA 3,037,590
INTERLOCKED PANEL STRUCTURE
Filed Dec. 26, 1952 2 Sheets-Sheet 1
INVENTOR:
John Pavlecka June 5, 1962 J. PAVLECKA 3,037,590
INTERLOCKED PANEL STRUCTURE
Filed Dec. 26, 1952 2 Sheets-Sheet 2
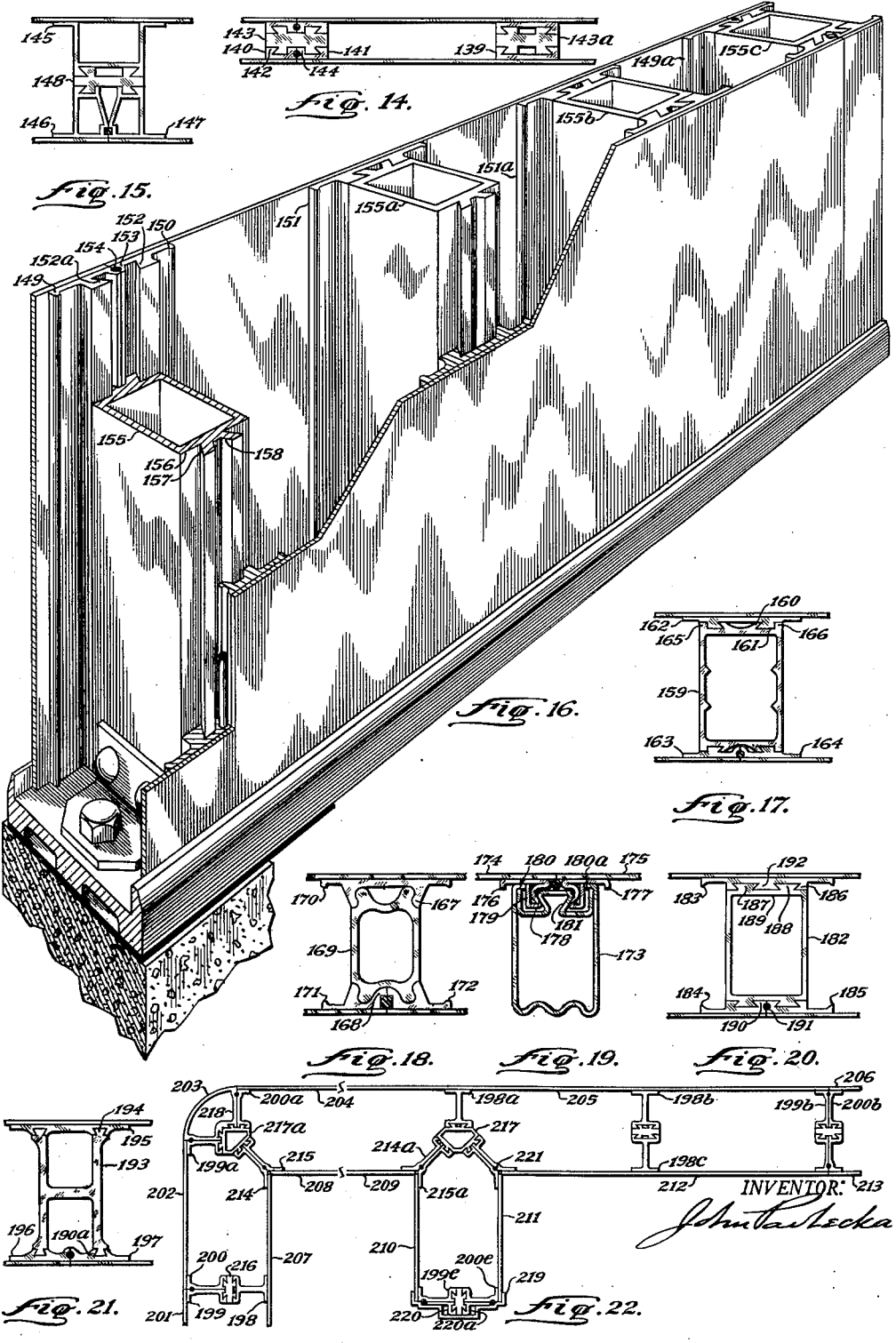

3,037,590
INTERLOCKED PANEL STRUCTURE
John Pavlecka, 8797 Capital, Oak Park 37, Mich.
Filed Dec. 26, 1952, Ser. No. 328,039
14 Claims. (Cl. 189—34)

This invention relates to structures such as walls, floors and partitions in buildings, decks, van and bus bodies, pallets, furniture, aircraft wings and control surfaces, etc., in general, and more particularly to a novel type of such structures in which adjoining or facing, or both adjoining and facing panels are interlocked with stress members by means of stringers on the panels.

The subject structure embodies the concept of panels interlocked with associated stress members or keying members in various useful relationships as first disclosed in my applications for Panel Structure, Serial Nos. 205,787 and 265,316, filed January 12, 1951 and January 7, 1952, respectively, and makes use of a distinct type of interlocking instrumentalities as do the structures in the following of my applications, all titled Interlocked Panel Structure:

Ser. No. 32,509, filed May 26, 1960
Ser. No. 301,010, filed July 26, 1952
Ser. No. 318,692, filed November 4, 1952
Ser. No. 324,903, filed December 9, 1952
Ser. No. 326,391, filed December 17, 1952
Ser. No. 632,601, filed January 4, 1957

One of the objects of this invention is a structure which is fabricated as individual completely finished components including panel units and stress members such as beams, studs, spars, trusses, girders, etc., and then assembled or later on dismantled for repairs, transfer, or inspection, with a minimum expenditure of labor and the fewest of tools.

Another object is a structure with a normally inaccessible interior, which is fabricated with complete accessibility as duplicate components and then readily assembled from them, and both their fabrication and assembly are effected without the usual hardware such as nails, rivets and screws because processes such as resistance welding and adheive bonding are applicable in their fabrication, and their assembly makes use of a slidably interlocked engagement of one with another.

Another object resides in devising a union for panels meeting at parting lines in a wall by means of mortised stringers or mortise means on them in joint engagement with a tenoned structural member for securing the panels to it frontally, and providing the stringers or mortise means with projections or flanks for a lateral engagement with the member and thereby securing the panels to it sidewise and constraining them against separation at their parting line.

Another object is to devise a union for panels meeting edge-to-edge as well as for panels in spaced apart facing relationships by means of mortised stringers on them in slidable engagement with a tenoned structural member, the stringers and the member bearing frontal lands at their maximum width astride their engagement for contact and abutment with each other whereby the panels are held in alinement at their parting line, contact between the member and the panel side is prevented, looseness, sway, vibration and rattling of the interlocked parts are minimized or eliminated, and the parts coact as a unitary stress member.

A further object is to make the use of thin panels for wall structures practicable by devising unions of the panels with tenoned structural members by means of mortised stringers or mortise means integral with the panels, i.e., either formed in one piece with them or attached permanently to them, the stringers including a base on their panel in opposition to the structural members for supplementing its thickness such as doubling it, and thereby distributing stresses into and from the member and stringer walls by the base over a large panel area.

Yet another object is a union for panels in spaced apart rows forming a hollow wall wherein structural members are located both at panel parting lines and at intervals therefrom, by means of mortised stringers integral with the panels, each two stringers on panels meeting at a parting line being jointly equivalent to one stringer apart therefrom, whereby panels of different widths can be joined in each row with each other and with the structural members, and the parting lines in both rows can occur in either coincidental or noncoincidental relationships at onyone of the members.

Another object is to devise a union of two meeting panels with a structural member by means of mortised stringers on the panels interlocked frontally with a tenoned profile of the member, the stringers having projections entered into the member for a lateral interlock therewith, and a resilient weather strip compressed by and between the projections for sealing the seam between the panels.

The overall object of my present invention is a complete structure of hollow walls assembled of panel units and structural members, such as studs, joists, beams, terminal members, corner posts, etc., the panel units and the members being interlocked with one another in all necessary relationships for forming the walls and intersections therebetween, by providing relatively thin panels and mortised stringers thereon as parts of the panel units, and providing frontal and lateral unions of such stringers with tenoned profiles of the members both at panel unit parting lines and apart therefrom, and providing for reinforcement of the thin panels in opposition to the members as well as for a relatively immovable bracing of the members against the stringers at frontal lands spaced apart from each other and from the panels.

The specific manner of accomplishing these and other objects of my invention will be disclosed first with reference to all the figures in the drawings forming an integral part of this specification, and then with reference to each one of the exemplary embodiments shown therein.

A structure according to this invention may consist of one or any larger number of panels which have stringers as auxiliary stress members and reinforcements integral with one of their faces, i.e., either fabricated originally with them of the same material or attached permanently to them, and as such become panel units; each panel unit has stringers extending on it at and along two of its concomitant edges of a type hereinafter referred to as "edge" stringers, and has usually other stringers, hereinafter referred to as "intermediate," at intervals apart from the edge stringers. When a structure embodies a number of such panel units, they may be disposed in various relationships which include coplanar or angular positions at parting lines or seams in one row, or in two spaced apart rows facing each other; disposed along such a row, or interjacent two facing rows, in opposite alinement with each two juxtaposed edge stringers and with each intermediate stringer are stress members or structural members which have different designations and various shapes and sizes in different structures, devised to sustain the loads in any particular application most effectively, and are known as beams, studs, joists, spars, girders, rafters, trusses, etc.; these stress members jointly with the stringers perform, in my new structure, additional functions, first of securing the panel units together demountably in both edge-to-edge and face-to-face relationships; secondly, rendering the panel units relatively immovable by contiguity and abutment with one another on a wide base; and thirdly, because of this abutment coacting as unitary stress members in the structure.

To this end, the stress members or structural members have a profile defined by a number of sides and extremities, and on one or more of these extremities carry laterally undercut or reentrant longitudinal tenon means consisting of a number, i.e., one or more of longitudinal tenons; the intermediate stringers are provided with complemental undercut or reentrant mortise means on their frontal face forming two contravening teeth therein; the profile of the edge stringers amounts of that of one half of an intermediate stringer bisected by a plane through the panel unit parting line, so that each edge stringer bears on it frontally at least one half of a reentrant mortise with one tooth or tongue spaced away from the parting plane and pointing toward it; when placed into juxtaposition, two such edge stringers combine to provide a full equivalent of one intermediate stringer, and they as well as the intermediate stringers are in a slidable engagement of the half-mortises and mortises therein with the tenon or tenons on the stress members, and due to the stringer teeth or tongues having a hold on the stress member tenons a frontal union is effected between the components of the structure.

The mortise-and-tenon engagement of two edge stringers with one structural member secures them to it frontally but not laterally, and additional means is provided for this purpose; it consists of a mortise, groove or recess extending lengthwise frontally on each tenon extremity of the structural members, and of frontal projections, ridges or tenons on the edge stringers; such projections of each two stringers are fitted slidably into the groove in the structural member in engagement therewith, and are engaged thereby at lateral flanks thereby to lock each stringer and panel unit thereof to the structural member laterally, and constrain the panel units against separation from each other at their parting line.

In order to make the structure of the foregoing disclosure impervious to elements, a sealing strip is lodged between each two edge stringers over the panel unit parting line, and is effectively contained in grooved beads formed on stringer bases, and is compressed therein by the lateral interlock of the stringers with the structural member thereat; such beads, when provided with lateral flanks, serve also as the projections or ridges that fit into the member and provide the lateral interlock therewith, as hereinabove referred to.

For rendering the union of the panel units and their stringers with the structural members free of play, and for obtaining the widest span for contact and abutment between them, frontal faces or lands are made use of on both the stringers and the structural members astride and along their interlocking formations; such lands are carried on shoulders along the stringer-mortise, and on ledges astride the tenon on the structural members, the contiguous shoulders and eldges being located remotely from the side of the panel unit to prevent the members from bearing against the side and, moreover, to provide bases in the stringers for reinforcement of the panel units. By employing dovetail mortise-and-tenon formations and a slidable wedge fit therefor on the engaged stringers and structural members, the shoulders and ledges thereon will be urged into abutment with each other for optimum coaction of the members with the stringers as unitary stress members.

Stringers embodying the foregoing features afford other important results whether they are fabricated in one piece with the panels as complete panel units, or bonded to them as sepaartely formed components; their body includes two side walls bearing frontal shoulders thereon and undercut to a grooved or dovetail shape to form at least one mortise therebetween, and the aforementioned base between the walls, which may also have marginal flanges therealong; tall stringers may include one supporting wall which intervenes between their base on the panel unit side and a cross-web carrying the mortise walls and shoulders distantly therefrom. The edge stringers are each a duplicate of one half of the intermediate ones, with the seal containing beads on their base and with lateral flanks either on the beads or on separate projections on the base for the lateral interfit with the structural members. In both types of the stringers, the base increases the thickness of the panel unit in front of the structural members, and by thus providing a large area at the location of their union with the panel units reduces specific loading and stress concentration, thereby making the use of thin panels or panel units practicable.

These novel structural principles are applicable to innumerable embodiments some of which are illustrated in the drawings and are described in the following paragraphs with reference thereto; in the drawings:

FIG. 1 is an end view of a structure including all the basic components and their characteristic features of my invention;

FIG. 2 is a union between panels in facing and adjoining relationships and stringers thereon interlocked with a box type of stress member;

FIG. 3 is a perspective view of a length of a wall in a building, partially sectionalized, showing the components of the wall in engagement with one another;

FIG. 4 is an end view of a structural union employing an I-beam as the stress member for locking together panels through stringers thereon;

FIG. 5 is another structural union in which a box stress member is interlocked with stringers by means of bulbous tenons and mortises thereon;

FIG. 6 is a union such as used in the structure of FIG. 3 except in that stringers of sheet material are used;

FIG. 7 is a union of stringers with a structural member in which the interfitted main tenons and mortises have beveled grooves and teeth thereon;

FIG. 8 is a union wherein all the associated components are of sheet material;

FIG. 9 is another structural union, the stress member in it being an H-beam with round beads on it fitting into grooves in associated stringers;

FIG. 10 is another H-beam of extruded origin and with arcuate flanks on the interlocking mortise-and-tenons means borne on it and on stringers held in unity by it;

FIG. 11 shows an end view of a structural union in which the stress member is reduced in height and, to compensate for it, the stringers interlocked by it are increased in height;

FIG. 12 is another such union but with channel stringers and a box stress member representing the principal components;

FIG. 13 is a union between a joist or stud and stringers on one row of panel units;

FIG. 14 is an end view of a portion of a structure substantially like that in FIG. 1 but with the interfitted teeth and grooves of pointed shape such as obtains on dovetail mortises and tenons;

FIG. 15 is an end view of a union of a stress member such as used in the structure of FIG. 14 but with tall stringers on widely spaced apart panels;

FIG. 16 is a perspective view, partly sectionalized, of a structure like that in FIG. 3 but with the studs and stringers therein bearing pointed teeth and grooves for frontal interlock, and beveled mortises and tenons for lateral interlock of the edge stringers therein;

FIG. 17 is a profile view of a tubular stress member in a union with stringers by means of dovetail instrumentalities, and with the stringers straddled by the stress member for lateral retention;

FIG. 18 is a profile of a union effected by arcuate teeth and grooves as well as ledges and shoulders pertaining to a stress member and stringers therein;

FIG. 19 is a structural union substantially like that of FIG. 13 but with the locations of the frontal and of the lateral engaging instrumentalities interchanged, the former being of dovetail shape;

FIG. 20 is a profile view of a tubular stress member interlocked with associated stringers both frontally and laterally by multiple dovetail tenons and mortises;

FIG. 21 is an H-beam with individual dovetail tenons on its extremities and corresponding mortises in associated stringers; and FIG. 22 is a plan view of hollow walls and intersections in a building assembled of panel units which are interlocked into unity both frontally and laterally by means of stringers and studs of only a few different shapes.

The structure of FIG. 1 includes panel units alined into edge-to-edge continuity with one another at parting lines in spaced apart facing rows 1—2 and 3—4; at and along each parting line on the panel units extend stringers 5—6 of the edge type, and apart from them stringers 7 of the intermediate type; the latter stringers include in their profile a base which includes a central web 8 and marginal flanges, and a lengthwise mortise; this mortise is defined by walls such as 9 standing on the base and bearing frontal shoulders such as 10 on them, and under these shoulders is undercut to form teeth 11 and 12 directed toward each other; interfitted with this stringer and the teeth 11 and 12 therein is a structural member 13 the body of which can have any shape or size in various applications of this invention, but in all of them bears certain characteristic features which include lateral projections 14 and 15 as portions of a tenon in the flanks of which run grooves such as 16, of a rectangular shape corresponding to that of two of the stub teeth 11 and 12 in a side-by-side relationship; a longitudinal recess with flanks such as 18 runs in the central tenon portion for purposes disclosed presently; the structural member grooves 16 are in a slidable engagement with the stringer teeth 11 and 12 of both of the opposite stringers 7 and 7a, while the tenon projections 14 and 15 occupy the stringer mortise, thereby locking the two stringers and their panels 2 and 4 into unity in contiguity of their shoulders 10.

At panel unit parting lines, the edge stringers 5—6 represent each one half of the intermediate stringer 7 in that their profile includes a base in opposition to one half of the structural member 13a, and a divided mortise with a tooth 19 underneath a shoulder 20; in juxtaposition, both edge stringers jointly amount to the stringer 7, and are in an engagement with a structural member 13a by virtue of their teeth 19 fitting into its lateral grooves, and thus become locked to it against separation in the frontal direction but not in the lateral one; for this purpose each of the edge stringers 5—6 is provided with a ridge 21 on its base with a flank on the side away from the parting plane; this ridge fits into the recess in the stress member 13a against the flank 18 therein (as numbered in the member 13), and in this manner each edge stringer and its panel is interlocked individually with the stress member 13a in the lateral direction as well as frontally.

At the dividing plane between the stringers 5—6 a lengthwise groove runs in the base of each one of them in the proximity of the panel unit parting line, and a sealing strip 22 is deposited therein.

It is thus evident that the structural member 13 or 13a can be interfitted interchangeably with either two intermediate stringers 7 and 7a, or with four edge stringers 5—6 and 5a—6a, or a combination of them; this principle of equivalency of the two types of stringers is of basic importance because it makes it feasible to place the panel units in the facing rows in any random relationship of the parting lines therein, allows the parting lines to be located where they are not objectionable, and permits the use of panel units of different widths which are multiples of the distance between the axes of two stringers on them.

It is further evident from FIG. 1 that there are six basic components constituting the structure therein, i.e., three panels in adjoining and facing relationships, an intermediate stringer, an edge stringer, the latter in duplicate, and a structural member; these six components, permutatively associable with one another, are representative of a structure of any extent, and a number of various unions of these components is shown in certain of the following figures.

The union in FIG. 2 includes stringers 23 and 24—25 on appertaining panels, and a structural member or a stress member 26 of rolled sheet stock the profile of which forms two laterally grooved tenons, the grooves such as 27 running between tenon projections 28, and a central recess running in each tenon between opposite flanks such as 29; the stringer 23 has a profile analogous to the stringer 7 of FIG. 1 with a web on the panel providing a base, lateral walls thereon bearing frontal shoulders, and a mortise created by its channel shape and contravening teeth such as 30 under the shoulders; the edge stringers 24—25 represent each one half of the stringer 23 and, in addition, next to the parting plane each one has a flange 31 turned up from its base, which flange fits into the recess of the stress member 26 side-by-side with its companion stringer flange, and both of them are thus locked into unity in the lateral direction; and all three stringers 23 and 24—25 are interlocked in the frontal direction with the member 26 by having their teeth fit side-by-side into its grooves 27 in a shoulder-against-shoulder contiguity and abutment with each other. A sealing strip is compressed by the stringer flanges 31 in the stress member recess.

An application of the foregoing principles and structural features to a wall in a building in FIG. 3 includes panel unit rows 32—33—34 and 35—36—37, and edge stringers 38 and 39 on each one of them, and at intervals between these stringers others of the intermediate type 40; the latter are of a profile similar to that of the stringers 7 of FIG. 1; the edge stringer 38 in juxtaposition with its twin 39a jointly constitute an equivalent of the stringer 40; each of them has a flange and base 41 and a frontal shoulder 42 borne at a distance from it, and has one half of a reentrant mortise in it formed by a tooth 43 underneath the shoulder; at and along the parting plane on the base 41 each edge stringer has a ridge 44 with an oblique lateral flank and an inner longitudinal groove, the latter for containing a sealing strip 45. Interjacent the two panel unit rows in opposed alinement wtih the stringers thereon stand studs 46 which have side walls 47 and on them profile extremities consisting of a cross-web 48 and a centrally recessed longitudinal tenon with rectangular grooves such as 49 running in its flanks between a ledge 50 and a projection 51. These instrumentalities interfit with the mortise in the intermediate stringers 40 and in the combined edge stringers 38—39a, as do the edge stringer combined ridges 44 with the stress member recess, thereby locking all stringers and stress members into unity both frontally and laterally with the stringer shoulders 42 in contiguity with the stress member ledges 50, and with the panels held edge-to-edge at their parting line by the oblique flanks of the ridges 44 wedged into the recess in the studs 46.

The mounting of this wall on a foundation 52 is effected by first securing a sill 53 to the foundation in the usual manner, and then placing the studs on the sill and attaching them to it, loosely at first, by means of brackets 54 held on the studs by rivets 55, and bolts 56; then the panel units are interfitted with the studs and lowered down part way, at which stage the bolts 56 are tightened up fully to anchor the studs in their freely slidable interfit with all the associated stringers, whereupon the panel units are let down onto the sill.

In the union of FIG. 4 the stress member 57 is an I-beam with tenons such as 58 on its profile extremities and a central recess 59 in them; stringers 60 and 61—62 are of sheet material and include a flanged base 63 and lateral walls such as 64 having their outer portions turned concurrently to form two teeth as part of a reentrant mortise which encompasses the beam tenon extremity and obtains an engagement with it; the edge stringers 61—62 have their base flanged at and along the parting line to form a projection or ridge 65 thereat, and these ridges fit jointly into the beam recess 59 to lock the stringers and their panels laterally to the beam 57 as well as compress a sealing strip 66.

A tubular stress member 67 is used in the union of FIG. 5, and tenons 68 on its profile extremities are of a circular shape, and a recess 69 runs centrally in each of them and ledges such as 70 run alongside the reentrant flanks of the tenons; an intermediate stringer 71 has a profile known as the "hat" shape in that it has tall sides such as 72, and between two shoulders on them has a circular mortise 73 the reentrant flanks of which form two contravening teeth; held between these teeth in the mortise is the tenon 68 of the stress member; a similar mortise made up of two halves such as 74 in edge stringers 75—76 is in engagement of the other stress member tenon; a marginal flange 77 on the stringer base locks it to the stress member laterally by engaging the recess therein jointly with its companion stringer; the stringers abutted at their shoulders against the ledges 70 impart rigidity and lateral stability to this union.

The embodiment of FIG. 6 includes a stress member 78 which is similar to the stud 46 in FIG. 3; stringers 79 and 80—81 are of rolled sheet stock and are in the same contiguity of shoulders on them with ledges on the stress member 78 as their prototypes of FIG. 3; in the edge stringers 80—81 are formed with flanges such as 82 on their bases at a distance from the parting lines, so that in engagement with the member 78 they lock their panels together edge-to-edge, and also create a hole over the panel edges for a sealing strip 83.

A similar configuration of the interfitted instrumentalities and of the abutted shoulders and ledges astride them is used on the stress member 84 and stringers 85—86 in the union of FIG. 7, except in that the matched engaging faces 88 on the stress member tenons and stringer mortises are beveled, resulting in a wedge engagement of the interfitted parts and abutted relationship of the stringer shoulders with the stress member ledges.

A structural union employing sheet material for all of its components, similarly as those of FIGS. 2 and 5, is shown in FIG. 8, and includes a stress member 89 the body of which is fabricated of outwardly flanged side walls and channels 90 inserted between them and having flanges doubling up those on the side walls to provide the stress member with tenon instrumentalities 97, with the channel 90 providing a central recess in them. Stringers 91 and 92—93 are of a channel shape such as disclosed in the union of FIG. 2, with a web on the panels thereof in opposition to the stress member as an attaching base, side walls on the base, and two contravening teeth such as 94 on the walls forming an undercut mortise in engagement with the tenon 97. The stock in the stringers 92—93 forms a base and in it a beveled recess at the parting plane for a sealing strip 95, and beyond it over this base forms a projection 96 with a lateral flank; the projections on both stringers fit jointly into the channel 90 as into a mortise and are locked together by it in the lateral direction while being held by the stress member tenon 97 in unity with it in the frontal direction.

An H-beam 98 in the union of FIG. 9 differs from the preceding embodiment in the shape of its interfitting extremities which consist of round beads 99 along the edges of channels 100, these channels make up the beam together with side walls 101 and on both of its extremities provide beveled ledges alongside the beads 99; stringers 102 and 103—104 have bases on their panels and mortises formed by lateral walls with teeth such as 105 for engaging the beads 99 slidably and have beveled shoulders over these teeth in contiguity with the ledges on the beam; as in the preceding union, the stringers 103—104 are formed each with a ridge 106, and both ridges are fitted between the inner faces of one of the beam channels 100 to cause their panels to come together edge-to-edge at the parting line and to compress a sealing strip thereat.

An H-beam of extruded origin, 107, in the union of FIG. 10 has arcuate tenon flanks on its extremities, and stringers 108 and 109—110 obtain a hold on them by teeth 111 of corresponding shape provided by a mortise, or combined half-mortises, with reentrant concave flanks over a web on their panels as the mortise bottom and stringer base; for lateral interlock, the stringers 109—110 are provided with ridges 112 the outer flanks of which fit in between the beam side walls, thereby causing each two meeting panels to cohere edge-to-edge at their parting line.

In the preceding embodiments the distance between the stringers on facing panel units is bridged over by stress members or structural members of various sizes, the stringers being relatively low in height in order to concentrate the material in the union close to the panels; in certain applications it may be preferable to use a stress member of limited dimensions and let the stringers span the distance between the panel units instead; an embodiment based upon this dimensional modification is shown in FIG. 11, and makes use of a member having the profile of an I-beam 113 such as disclosed in the structure of FIG. 1, and of stringers 114 and 115—116 of the "hat" shape similar to those in FIG. 5; they include flanges 117 as their base, side walls 118 ending with frontal shoulders, and between and under them including a mortise on a cross-web 119 with contravening teeth 120 underneath the shoulders. The stringers 115—116, in addition to possessing all the features of one half of the stringer 114, have each a ridge 121 on their cross-web for fitting into a recess in the member 113 for lateral engagement, and have a wall 122 standing on a base at the parting line plane, and supporting the cross-web and together with its counterpart on the twin stringer containing a sealing strip 123.

Any other stress member or structural member may, of course, be associated with the type of the stringers of FIG. 11, and a tubular one 124 is shown in FIG. 12 with tenon and mortise formations on it substantially like those on the member 113 in the foregoing union; stringers 125 and 126—127 are of open channel sections in that a web in opposition to the structural member provides a base 128 and connects the side walls in the former stringer; the stringers 126—127 also include a web as their base, and the bases of both stringers confront each other at a plane through the panel parting line, and a sealing strip is lodged between them thereat; remotely from its base each stringer includes another web in opposition to the member 124, which web carries a ridge 121a; both stringers and their panels are locked together by having their ridges 121a fitted into a groove in the member 124.

A structure employing my invention may consist of but a single panel unit and a number of stress members, or of but one row of such panel units, and FIG. 13 shows a union between a stress member 129, and panels 130—131 in one row; the member 129 may be a stud in a wall of a utility building or a joist in a floor; it consists of a main U-shape with coplanar flanges such as 132 along its extremities in the manner of the flanges on the member 89 of FIG. 8, and of an auxiliary channel 133 inserted between its side walls as a spacer and to provide a recess for straddling stringers 134—135 on the panels in the same manner as already disclosed in FIG. 8; each of these stringers has a base in opposition to one half of the member 129, and a mortise formed by its base and a marginal portion 136 folded over it to function as a tooth or tongue for engaging the stress member flange 132; at the dividing plane, each stringer has a recessed wall for a sealing strip 137, and set apart from it another wall 138 which interfits as a ridge with the channel 133 in the stress member 129 for a lateral lock therewith.

Among the shapes for the interlocking tenons and mortises belongs the dovetail shape as a most useful one in that it possesses strength and because of its divergent flanks in a slidably wedged fit with each other are useful to urge the stringer shoulders into abutment with the stress member ledges; stringers 139 and 140—141 in the structure of FIG. 14 equipped with such dovetail mortises between marginal shoulders differ from those in FIG. 1 in that their teeth such as 142, and consequently the grooves in the tenons on stress members 143 for them, have inwardly divergent flanks instead of parallel ones, so that engaging contact between the interlocked components is between two faces of a wedge; a slidable wedge fit between these components will cause the stringer shoulders to bear forcibly against ledges astride the tenon on the stress member 143; for lateral engagement, a square projection or ridge 144 runs on the base of each edge stringer at and along the dividing plane and a sealing strip is lodged between the ridges of both stringers; in a complemental manner, the member 143 is grooved lengthwise in its mid-section and is in an engagement of its groove with the ridges 144, thereby locking the stringers and their panels together at their parting line and compressing the sealing strip between the stringer bases.

The same dovetail instrumentalities are applied in the union of FIG. 15 to "hat" type of stringers 145 and 146—147, and to a stress member 148; the stringer profile, except for the dovetail shape of the mortises in it, is analogous to that of the stringers of FIG. 11; the member 148 includes centrally recessed tenons on its extremities and ledges alongside them in contiguity with stringer shoulders, the tenon flanks having divergent directions and being in a slidably wedged fit in the stringer mortises whereby they will urge the stringers into abutment of their shoulders with the ledges on the member 148.

Dovetail mortise-and-tenon formations distinguish the wall structure in FIG. 16 from the one in FIG. 3; in it, juxtaposed edge stringers 149—150 complement each other as an equivalent of an intermediate one 151, and have contravening teeth 152 provided by inwardly divergent mortise flanks under frontal shoulders; in addition, each edge stringer has a base and a beveled ridge 153 on it for containing a sealing strip 154 jointly with its mate as well as for being locked laterally by a stud 155; the profile extremities of this stud are congruent with those on the stringers and consist of a tenon between ledges such as 156; the tenon flanks are divergent, and centrally through the tenon runs a recess 158 of a profile conforming to the combined ridges 153 in the stringers 149—150 so that it fits over them and urges them and their panels towards each other.

The lateral locking means on two juxtaposed edge stringers and on a stress member may be placed exteriorly to the frontal interlocking means, as shown in the union of FIG. 17; in this union a stress member 159 bears on its profile extremities dovetail tenons such as 160, between frontal lands such as 161, for engaging stringers 162 and 163—164 in the frontal directions; for engaging the latter two stringers laterally the member 159 is provided with projections 165 and 166 as terminal portions of its side walls alongside the lands 161; these projections straddle the bodies of the stringers 163—164 and lock them and their panels together at their parting plane.

Other modifications of the interfitted parts are shown in the union of FIG. 18, and reside in rounded corners on the stress member tenons and stringer teeth, such as 167, and on the edge stringer half-tenons 168, such as are suitable for a stress member 169 and stringers 170 and 171—172 made of ceramic material.

An application of the interlocking instrumentalities of the type disclosed in FIG. 17 to parts fabricated of sheet material is illustrated in FIG. 19; this union is, by way of an example, between a stud or joist 173 and panel units 174—175, with stringers 176—177 on them, in one row only; the stringers have bases on their panels and on them jointly form a reentrant mortise 178, and lateral walls 179 alongside of it; the stud or joist 173 is composite of a U-shape with concurrently turned flanges 180 on its extremities, and of a channel inside of it with a dovetail tenon 181 as a part of its cross-web; in the assembled relationship, combined half-mortises 178 interfit with this tenon by holding onto its dovetail flanks with their teeth for frontal engagement, and the stud or joist flanges 180 straddle the stringer side walls 179 to lock them and their panels laterally in a manner analogous to the projections 165 and 166 on the stress member in FIG. 17.

The stress member 182 in the union of FIG. 20 is interlocked with stringers 183 and 184—185 by means of dovetail instrumentalities which include two contravening teeth such as 186 under marginal shoulders on the stringers, and corresponding grooves in stress member tenons 187 and 188; centrally between these tenons runs a recess in the stress member cross-web 189, the flanks of which have the same dovetail shape as the tenons 187 and 188 on the stress member; interfitted with this recess in one profile extremity of the member are two divided ridges 190 on the combined edge stringers 184—185 for locking them and their panels together at their dividing plane and for compressing a sealing strip 191 between them; the intermediate stringer 183 may be provided with a corresponding ridge or tenon 192 of dovetail shape to interfit with the central recess in the member 187 so that multiple dovetail mortise-and-tenon formations result on both the stress member and the stringers, and the number of the tenons and mortises on them can be increased in various applications to any practical number.

Plural dovetail mortise-and-tenon means for locking together stress members and stringers both frontally and laterally between contiguous marginal ledges and shoulders are employed in the union of FIG. 21; in it an H-beam 193 has individual dovetail tenons such as 194 and marginal ledges therealong running lengthwise on its extremities, and a stringer 195 has a base and on it two corresponding mortises between shoulders for engaging those tenons slidably in a shoulder-against-ledge relationship; edge stringers 196—197 carry each one such mortise between two shoulders, and their portion inwardly of it constitutes a dovetail projection 190a which fits complementally with its mate inbetween the two beam tenons of the kind 194, and by virtue of a slidably wedged fit between them urges the stringers and their panels into abutment with one another at the dividing plane.

The unions hereinabove referred to are particularly useful when used in combination with one another to devise a whole structure, and FIG. 22 documents this principle as well as the principle of equivalency between intermediate and juxtaposed edge stringers; it is a structure of house walls and intersections between them constructed of facing panel unit rows and stringers on them of a few different profiles and interlocked in various combinations by only two different types of studs; all of the stringers are, by way of an example, of a type in which a single web on a base supports a longitudinally mortised profile extremity similar to that on the stringers of FIG. 14, with two marginal shoulders and contravening teeth underneath them in intermediate stringers such as 198; in edge stringers such as 199—200 the single web supports an extremity with one shoulder alongside one half of such a mortise and one tooth in it, and with a ridge in the half-mortise, such as characterize the majority of the foregoing embodiments for locking stringers and panels together relatively immovably in adjoining and in spaced apart facing relationships.

The edge stringers 199—200 are used at all parting lines at which the panel units meet coplanarly with one another in rows 201 to 206, 207 to 210, and 211 to 213; wherever they meet angularly, as at intersections, type 214—215 of edge stringers is used which differs from the former one in that its base includes an obtuse angle with its supporting web. Both at the intersections and apart from them the edge and intermediate stringers are directed towards stringers of either their own kind or of the other kind on facing panel units, and their profile extremities are distanced one from another either in parallel or in angular positions; stress members or studs having each a number of profile extremities, one extremity opposite each of the stringer positions, and bearing laterally undercut and centrally grooved tenons and marginal ledges congruent with the stringer extremities, are slidably interfitted with them in a shoulder-against-ledge contiguity and abutment; one such stud 216 is used extensively in straight walls, and may have the profile of the stress members of FIGS. 14 and 15; another one, 217, used at intersections, is of a tubular profile with a grooved tenon and marginal ledges on each of its three extremities, one extremity opposite each stringer or combined edge stringers, whereby such a stud is capable of locking into unity a cluster of stringers; those shown include an intermediate stringer 198a, and for edge stringers such as 214a—215a, and may include as many as six stringers if the stringer 198a is substituted for by two edge stringers of the type 199—200 on two meeting panels which may take the place of the continuous one 205.

Members devised for specific purposes and locations in such a wall structure are integrated with the panel units in it by means of interjacent studs and standard or special stringers; one such member is a corner post 203 which stands as a quadrantal segment in a panel unit row and amounts to one such panel unit the relatively small size of which permits it to be extruded integrally with radially directed walls such as 218, these walls bearing jointly an extremity consisting of two half-mortises each of which runs next to one of two shoulders at right angles to each other at a corner, and of a ridge in each mortise at the dividing plane; these half-mortises interfit with two tenons on a stud 217a jointly with edge stringers 199a and 200a on respective converging panel units 202 and 204 in two right-angle walls; the six ledges on the stud 217a in contiguity with the shoulders on the five components interlocked with it render the union relatively immovable.

Another such member is a window jamb or door stile 219 which stands transversely of panel units 210 and 211 in a wall, and in that respect represents any crosswise terminal member such as a panel unit in one row to which a partition or a wall is secured in the same manner; this is effected by stringers 220 and 220a attached to the inner face of the member 219, each of which has a profile extremity equivalent to that of an edge stringer, and both of them assume juxtaposed positions to edge stringers 199e and 200e on the panel units 210 and 211, respectively, and are interlocked into unity with them by one of the studs 216; the interlocking formations on the stringers 220 and 220a could, of course, be extruded integrally with the member 219.

I claim:

1. In a structure, a number of panels in a row meeting one with another at parting lines, structural members coextensive with one face of said panels at and along said parting lines, structural members coextensive with said panel face at intervals apart from said parting lines, each of said structural members having a profile extremity in opposition to said panel face, said extremity including two ledges at a distance from said panel face and an undercut lengthwise tenon means between said ledges, intermediate stringers on said panels at intervals apart from said parting lines, each of said stringers bearing a mortise means in a slidable frontal and lateral engagement with one of said structural member tenon means and alongside said mortise means bearing shoulders in contiguity with said structural member ledges, stringers in juxtaposition on said panels at and along said parting lines, said stringers in juxtaposition bearing each one half of a mortise means and a frontal shoulder therealong on the side away from said parting line, said mortise means and shoulder on each two stringers in juxtaposition being jointly equivalent to said intermediate stringer mortise means and shoulders and being in a slidable frontal engagement with one of said structural member tenon means and in contiguity with said ledges thereon, and means on said stringers in juxtaposition interfitted with said structural member in frontal engagement therewith for locking said stringers and panels thereof to said member laterally.

2. In a structure, two panel units including relatively thin panels, said panels meeting with each other at a parting line, a structural member coextensive with said panels along said parting line, said member having an undercut longitudinal tenon means thereon at a distance from said panels, laterally undercut mortise means forming a part of each of said panel units and extending at and along said parting line thereon, said mortise means on both panel units being jointly in a slidable frontal engagement with said structural member tenon means, each of said mortise means having a base on the panel thereof for increased thickness of said panel unit in opposition to said structural member, longitudinal frontally projecting means on each of said mortise means fitted into said structural member for a lateral engagement therewith, the bases of both of said mortise means confronting each other at a plane through said panel parting line, and resilient sealing means lodged between said bases at and along said parting line and being compressed therein by said lateral engagement of said mortise means with said structural member.

3. In a structure, two panel units including relatively thin panels, said panels meeting with each other at a parting line, a structural member coextensive with said panels along said parting line, said member having an undercut longitudinal tenon means thereon at a distance from said panels, laterally undercut mortise means forming a part of each of said panel units and extending at and along said parting line thereon, said mortise means on both panel units being jointly in a slidable frontal engagement with said structural member tenon means, each of said mortise means having a base on the panel thereof for increased thickness of said panel unit in opposition to said structural member, longtitudinal frontally projecting means on each of said mortise means fitted into said structural member for a lateral engagement therewith, said means for locking said mortise means and said panel units together residing in said structural member tenon means having a central recess therein, and ridges on the bases of said mortise means at and along a plane through said panel parting line, said ridges being fitted into said recess for said lateral engagement with said structural member, and resilient sealing means lodged between said ridges at and along said parting line and being compressed by said ridges fitted into said recess.

4. In a structure, two panels meeting with each other at a parting line, a structural member coextensive with said panels along said parting line, said member having a laterally undercut longitudinal tenon means thereon facing both of said panels in a spaced apart relationship thereto and having two ledges astride said tenon means facing each one of said panels at a distance therefrom, stringers on said panels at and along said parting line, each of said stringers having a laterally undercut mortise means in a slidable frontal engagement with one half of said structural member tenon means and alongside said mortise means having a shoulder in contiguity with one of said structural member ledges, and on the panel thereof each of said stringers having a base in opposition to said structural member and having wall means standing on said base and bearing said mortise means and shoulder thereof, and means on both of said stringers bearing flanks facing away from each other, said flank bearing means of both stringers being in a lateral engagement with said structural member for locking said stringers and panels thereof to said member laterally.

5. In a structure, components and their relationships as set forth in claim 4, said mortise bearing wall means of said stringers including a lateral wall in each stringer standing on said base thereof and bearing said shoulder frontally thereon, and underneath said shoulder said wall being undercut to form at least one half of a reentrant mortise over said base and ridges extending on said base of said stringers at and along said parting line and bearing said flanks thereon and being in said lateral engagement with said structural member thereat.

6. In a structure, components and their relationships as set forth in claim 4, said two panels meeting angularly with each other at said parting line, said mortise means and shoulder of both said stringers being at right angles to a plane through said parting line, and said stringer wall means standing at an inclination to said base thereof.

7. In a structure, component and their relationships as set forth in claim 4, said structural member tenon means and said mortise means on both of said stringers in engagement therewith being spaced a relatively large distance away from said panels, said stringer wall means of each stringer consisting of a wall spaced apart from a plane through said panel parting line and bearing said shoulder frontally thereon and being undercut thereunder to form a lateral half of said mortise means between said wall and said parting line plane, a cross web supporting said wall and having a lengthwise ridge extending thereon and bearing one of said flanks thereon and being fitted thereat into said lateral engagement with said structural member, and a web standing on said stringer base and supporting said crossweb.

8. In a structure, two panels meeting with each other at a parting line, a third panel coextensive at a distance with said parting line, a structural member having a profile extremity opposite said meeting panels along said parting line and another like extremity opposite said third panel, each of said extremities including two ledges at a distance from the respective panel and panels and a laterally undercut lengthwise tenon means therebetween, a stringer having a base on said third panel in opposition to said structural member and wall means thereon bearing an undercut lengthwise mortise means and marginal shoulders therealong, stringers in juxtaposition with each other on said meeting panels at and along said parting line, said stringers in juxtaposition being each equal substantially to one lateral half of said third panel stringer and jointly providing an equivalent of said base, wall means, mortise means and shoulders thereof, said structural member being in frontal and lateral engagement of one of said tenoned extremities thereof with said third panel stringer mortise means and being in frontal engagement of said other extremity with said meeting panels stringer mortise means and being in contiguity of said ledges thereof with said stringer shoulders, and means on said alined panels stringers in juxtaposition interfitted with said structural member for locking said stringers and panels thereof laterally to said member.

9. In a structure, two spaced apart panels facing each other and having coextensive edges, a terminal member situated crosswise of said panel edges, a structural member interjacent said panels at and along said terminal member, said structural member having laterally undercut longitudinal tenon means in opposition to and at a distance from each of said panels, a stringer on each of said panels at and along the edge thereof, said stringer on each panel bearing a mortise means in a slidable frontal engagement with one half of said structural member tenon means on the side away from said terminal member, said terminal member bearing a mortise means in a slidable frontal engagement with the other half of each of said structural member tenon means complementally to said stringer mortise means, and longitudinal ridges on said stringer on each panel and on said terminal member interfitted with said structural member for locking said stringer on each of said panels as well as said terminal member laterally to said structural member.

10. In a structure, panels in straight and angular spaced apart facing rows forming an intersection between hollow walls, one or more of said panels being continuous through said intersection, each two of the others of said panels meeting each other at a parting line thereat, a structural member interjacent said panel rows at said intersection, said structural member having a number of profile extremities in opposition each to one of said panel rows, each extremity including two ledges at a distance from one of said panel rows and an undercut lengthwise tenon means between said ledges, a stringer on each of said continuous panels, said stringer reaching to the structural member extremity in opposition thereto and bearing a mortise means in a slidable frontal and lateral engagement with said tenon means thereon and bearing shoulders in contiguity with said structural member ledges, stringers in juxtaposition on each two of said panels at and along said parting line therein, each two of said stringers in juxtaposition reaching to one of said structural member extremities and bearing a divided mortise means jointly equivalent to said continuous panel stringer means in a slidable frontal engagement with said extremity tenon means and bearing shoulders in contiguity with said structural member ledges, and means on said stringers in juxtaposition in a slidable lateral engagement with said structural member for locking said stringers and panels thereof to said member sidewise.

11. In a structure, components and their relationships as set forth in claim 10, three panel rows forming said intersection between two walls, a panel in a straight row being continuous through said intersection, panels in two other rows facing one another and facing said continuous panel and meeting each other angularly at two parting lines at said intersection, said tenon means and said ledges on each of said structural member extremities in opposition to said angular panel rows being at right angles to an inclined plane through the parting line therein, and said stringers in juxtaposition at each of said parting lines reaching to one of said extremities in a direction diagonally across said intersection and bearing said shoulders thereof in contiguity with said structural member ledges in a plane crosswise of said diagonal direction.

12. In a structure, panels in spaced apart inner and outer rows forming a right-angle intersection between hollow walls, two inner row panels meeting with each other angularly at a parting line, two outer row panels being related angularly and being distanced from each other, a segmental post between said distanced panels in continuity therewith at two parting lines, a structural member interjacent said panel rows at said intersection, said member having a profile extremity in opposition to each two of said parting lines and another one in opposition to said inner row panel parting line, each extremity including a longitudinal undercut tenon means and two ledges astride thereof at a distance from said panel rows, stringers based side-by-side on said inner row panels at and along said parting line therein, stringers based on said outer row panels side-by-side with said post at said two parting lines, said stringers side-by-side and said post and stringers side-by-side therewith bearing each a mortise means in frontal engagement with one half of said structural member tenon means on the extremity in opposition thereto and bearing each a shoulder in contiguity with one of said structural member ledges, and means on said stringers side-by-side and on said post and stringers side-by-side therewith interfitted with said structural member for a lateral engagement therewith.

13. A structure including, panel units in spaced apart straight and angular rows forming hollow walls and L- and T-intersections therebetween, said panel units in each row being in continuity with one another at parting lines located in said walls and at said intersections, certain of said parting lines in said spaced apart rows being situated in coincidental and others in non-coincidental relationships, intermediate stringers extending on said panel units apart from said parting lines and bearing laterally undercut longitudinal mortise means frontally thereon, edge stringers extending on said panel units at and along said parting lines and each bearing longitudinal mortise means frontally thereon corresponding to a lateral half of said intermediate stringer mortise means and having a lengthwise tooth in said mortise means, said edge stringers being juxtaposed at each parting line and being complemental to each other in forming an equivalent of said intermediate stringer mortise means for effecting both said coincidental and non-coincidental parting line relationships as well as for random occurrence of said parting lines at any one of modular intervals, certain of said intermediate and of said juxtaposed stringers at said coincidental and non-coincidental parting lines and apart therefrom on said straight and angular panel unit rows being directed squarely and others being directed angularly towards one another, said mortise means on said angularly directed stringers being at right angles to a plane bisecting the angle between the panel units thereof, and stress members having each a number of profile extremities and bearing longitudinal laterally undercut tenon means thereon, said tenon means having a lengthwise groove running therein, each of said stress members being in a slidable frontal engagement of said tenon means thereof with said mortise means on said intermediate and on said juxtaposed stringers in opposition thereto in said walls and intersections, and each of said juxtaposed stringers being in a slidable lateral engagement of said tooth thereof with said groove in the stress member in opposition thereto.

14. A structure including, panels in straight and angular rows coextensive with one another and spaced apart to form hollow walls and intersections therebetween, certain of said panels meeting coplanarly with one another at parting lines located in said straight rows and at certain of said intersections, others of said panels meeting angularly with one another at parting lines located at said intersections, certain of said panels in coextensive rows having coterminous edges, terminal members situated crosswise of said panel edges, intermediate stringers on the inner faces of said panels at intervals apart from said parting lines therein, said stringers bearing each two marginal shoulders at a distance from said panels and an undercut lengthwise mortise means therebetween, stringers in juxtaposition with each other on the inner faces of said panels at and along said parting lines therein, said stringers in juxtaposition bearing each a marginal shoulder at a distance from the panel thereof and apart from the parting plane thereof and between said shoulder and said plane bearing an undercut lengthwise mortise means, said shoulder on said stringers in juxtaposition on said angularly meeting panels being at right angles to an inclined parting line plane, each two stringers in juxtaposition being jointly equivalent to one of said intermediate stringer mortise means and shoulders, stringers on said panels at and along said coterminous edges, each of said coterminous edge stringers being equivalent to one of said stringers in juxtaposition, mortise means and a shoulder on said terminal members in juxtaposition to each of said terminal edge stringers and jointly therewith equivalent to two of said stringers in juxtaposition, structural members interjacent said panel rows at said parting lines and at intervals apart therefrom and at said terminal members, said structural members bearing profile extremities in opposition to said intermediate stringers and to said stringers in juxtaposition in the respective locations thereof on said panel rows and in opposition to said coterminous edge stringers and terminal member mortise means in juxtaposition thereto, said extremities including each a tenon means and two ledges therealong, said structural members being in a tenon-and-mortise slidable frontal and lateral engagement of said extremities thereof with said intermediate stringers and in a slidable frontal engagement with said stringers in juxtaposition and with said coterminous edge stringers and terminal member mortise means and being in contiguity of said ledges thereof with said stringer shoulders and with each terminal member shoulder, and lengthwise means on said stringers in juxtaposition and on said terminal member mortise means fitted into the structural members in said frontal engagement therewith and engaging said members laterally.

References Cited in the file of this patent

UNITED STATES PATENTS

| | | |
|---|---|---|
| 608,861 | Horton | Aug. 9, 1898 |
| 1,032,109 | Buckingham | July 9, 1912 |
| 1,116,391 | Davison | Nov. 10, 1914 |
| 1,381,823 | Griffin | June 14, 1921 |
| 1,826,127 | Ewing | Oct. 6, 1931 |
| 1,892,605 | Betzler | Dec. 27, 1932 |
| 1,965,601 | Kotrbaty | July 10, 1934 |
| 2,091,061 | Waugh | Aug. 24, 1937 |
| 2,103,407 | Dean | Dec. 28, 1937 |
| 2,356,309 | Garbe | Aug. 22, 1944 |
| 2,363,405 | Eichelberger | Nov. 21, 1944 |
| 2,369,373 | Sheldon | Feb. 13, 1945 |

FOREIGN PATENTS

| | | |
|---|---|---|
| 173,045 | Great Britain | Dec. 19, 1921 |
| 649,182 | Great Britain | Jan. 24, 1951 |
| 884,329 | France | of 1943 |